(12) United States Patent
Kido

(10) Patent No.: US 11,490,073 B2
(45) Date of Patent: Nov. 1, 2022

(54) IMAGE DISPLAY DEVICE AND CAMERA EVALUATION SYSTEM

(71) Applicant: JVCKENWOOD Corporation, Yokohama (JP)

(72) Inventor: Takeshi Kido, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 292 days.

(21) Appl. No.: 16/924,295

(22) Filed: Jul. 9, 2020

(65) Prior Publication Data

US 2020/0344465 A1     Oct. 29, 2020

Related U.S. Application Data

(63) Continuation of application No. PCT/JP2018/040126, filed on Oct. 29, 2018.

(30) Foreign Application Priority Data

Jan. 22, 2018  (JP) .............................. JP2018-007921

(51) Int. Cl.
*H04N 17/00*     (2006.01)
*G09G 3/36*      (2006.01)
(Continued)

(52) U.S. Cl.
CPC ......... *H04N 17/002* (2013.01); *G09G 3/3648* (2013.01); *H04N 7/01* (2013.01); *H04N 9/3179* (2013.01)

(58) Field of Classification Search
CPC ...... H04N 17/002; H04N 7/01; H04N 9/3179; G09G 3/3648
(Continued)

(56) References Cited

U.S. PATENT DOCUMENTS

| 2008/0088650 A1* | 4/2008 | Chen .................... G09G 3/3648 |
| | | 345/690 |
| 2011/0096058 A1* | 4/2011 | Nakahata ............. G09G 3/3648 |
| | | 345/212 |

(Continued)

FOREIGN PATENT DOCUMENTS

| JP | 6-54352 A | 2/1994 |
| JP | 8-317432 A | 11/1996 |

(Continued)

*Primary Examiner* — Brian P Yenke
*Assistant Examiner* — Omer Khalid
(74) *Attorney, Agent, or Firm* — Nath, Goldberg & Meyer; Jerald L. Meyer

(57) ABSTRACT

A video data processor converts input video data into sub-frame data in which one frame is composed of a plurality of sub-frames. A liquid crystal display device includes a display pixel unit in which a greater number of pixels than the number of pixels of the camera to be evaluated are arranged, and switches a display image to be captured by a camera for each frame asynchronously with the camera based on the sub-frame data to display the display image in a frame-sequential manner. The video data processor includes a sub-frame data conversion table which differs for each of a plurality of pixels corresponding to one pixel of the camera, and a sub-frame data converter configured to convert the video data into the sub-frame data for each of the plurality of pixels based on the sub-frame data conversion table.

8 Claims, 12 Drawing Sheets

(51) Int. Cl.
*H04N 7/01* (2006.01)
*H04N 9/31* (2006.01)

(58) Field of Classification Search
USPC .......................................................... 348/184
See application file for complete search history.

(56) References Cited

U.S. PATENT DOCUMENTS

2014/0267462 A1* 9/2014 Sato ........................ G02F 1/133
 345/89
2020/0314393 A1* 10/2020 Furuya ................. H04N 9/3111

FOREIGN PATENT DOCUMENTS

| | | |
|---|---|---|
| JP | 2004247979 A | 9/2004 |
| JP | 2005-24684 A | 1/2005 |
| JP | 2006-311029 A | 11/2006 |
| JP | 2009-77114 A | 4/2009 |
| JP | 2013-72725 A | 4/2013 |

* cited by examiner

FIG. 5A 231,331,431

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 1 | 0 | 0 | 0 | 0 | 0 | 0 | 0 |
| 2 | 1 | 1 | 0 | 0 | 0 | 0 | 0 | 0 |
| 3 | 1 | 1 | 1 | 0 | 0 | 0 | 0 | 0 |
| 4 | 1 | 1 | 1 | 1 | 0 | 0 | 0 | 0 |
| 5 | 1 | 1 | 1 | 1 | 1 | 0 | 0 | 0 |
| 6 | 1 | 1 | 1 | 1 | 1 | 1 | 0 | 0 |
| 7 | 1 | 1 | 1 | 1 | 1 | 1 | 1 | 0 |

FIG. 5B 232,332,432

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 1 | 0 | 0 | 0 | 0 | 0 |
| 2 | 0 | 0 | 1 | 1 | 0 | 0 | 0 | 0 |
| 3 | 0 | 0 | 1 | 1 | 1 | 0 | 0 | 0 |
| 4 | 0 | 0 | 1 | 1 | 1 | 1 | 0 | 0 |
| 5 | 0 | 0 | 1 | 1 | 1 | 1 | 1 | 0 |
| 6 | 0 | 0 | 1 | 1 | 1 | 1 | 1 | 1 |
| 7 | 1 | 0 | 1 | 1 | 1 | 1 | 1 | 1 |

FIG. 5C 233,333,433

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 1 | 1 | 0 | 0 |
| 3 | 0 | 0 | 0 | 0 | 1 | 1 | 1 | 0 |
| 4 | 0 | 0 | 0 | 0 | 1 | 1 | 1 | 1 |
| 5 | 1 | 0 | 0 | 0 | 1 | 1 | 1 | 1 |
| 6 | 1 | 1 | 0 | 0 | 1 | 1 | 1 | 1 |
| 7 | 1 | 1 | 1 | 0 | 1 | 1 | 1 | 1 |

FIG. 5D 234,334,434

| GRADATION VALUE | SUB-FRAME NUMBER | | | | | | | |
|---|---|---|---|---|---|---|---|---|
| | SF1 | SF2 | SF3 | SF4 | SF5 | SF6 | SF7 | SF8 |
| 0 | 0 | 0 | 0 | 0 | 0 | 0 | 0 | 0 |
| 1 | 0 | 0 | 0 | 0 | 0 | 0 | 1 | 0 |
| 2 | 0 | 0 | 0 | 0 | 0 | 0 | 1 | 1 |
| 3 | 1 | 0 | 0 | 0 | 0 | 0 | 1 | 1 |
| 4 | 1 | 1 | 0 | 0 | 0 | 0 | 1 | 1 |
| 5 | 1 | 1 | 1 | 0 | 0 | 0 | 1 | 1 |
| 6 | 1 | 1 | 1 | 1 | 0 | 0 | 1 | 1 |
| 7 | 1 | 1 | 1 | 1 | 1 | 0 | 1 | 1 |

FIG. 6

| | m-TH COLUMN | m+1-TH COLUMN | m+2-TH COLUMN | m+3-TH COLUMN | m+4-TH COLUMN | m+5-TH COLUMN | m+6-TH COLUMN | m+7-TH COLUMN | m+8-TH COLUMN | m+9-TH COLUMN | m+10-TH COLUMN | m+11-TH COLUMN |
|---|---|---|---|---|---|---|---|---|---|---|---|---|
| k-TH ROW | 231 | 231 | 231 | 231 | 231 | 231 | 231 | 231 | 231 | 231 | 231 | 231 |
| k+1-TH ROW | 232 | 232 | 232 | 232 | 232 | 232 | 232 | 232 | 232 | 232 | 232 | 232 |
| k+2-TH ROW | 233 | 233 | 233 | 233 | 233 | 233 | 233 | 233 | 233 | 233 | 233 | 233 |
| k+3-TH ROW | 234 | 234 | 234 | 234 | 234 | 234 | 234 | 234 | 234 | 234 | 234 | 234 |
| k+4-TH ROW | 231 | 231 | 231 | 231 | 231 | 231 | 231 | 231 | 231 | 231 | 231 | 231 |
| k+5-TH ROW | 232 | 232 | 232 | 232 | 232 | 232 | 232 | 232 | 232 | 232 | 232 | 232 |
| k+6-TH ROW | 233 | 233 | 233 | 233 | 233 | 233 | 233 | 233 | 233 | 233 | 233 | 233 |
| k+7-TH ROW | 234 | 234 | 234 | 234 | 234 | 234 | 234 | 234 | 234 | 234 | 234 | 234 |
| k+8-TH ROW | 231 | 231 | 231 | 231 | 231 | 231 | 231 | 231 | 231 | 231 | 231 | 231 |
| k+9-TH ROW | 232 | 232 | 232 | 232 | 232 | 232 | 232 | 232 | 232 | 232 | 232 | 232 |
| k+10-TH ROW | 233 | 233 | 233 | 233 | 233 | 233 | 233 | 233 | 233 | 233 | 233 | 233 |
| k+11-TH ROW | 234 | 234 | 234 | 234 | 234 | 234 | 234 | 234 | 234 | 234 | 234 | 234 |

FIG. 11

| | m-TH COLUMN | m+1-TH COLUMN | m+2-TH COLUMN | m+3-TH COLUMN | m+4-TH COLUMN | m+5-TH COLUMN | m+6-TH COLUMN | m+7-TH COLUMN | m+8-TH COLUMN | m+9-TH COLUMN | m+10-TH COLUMN | m+11-TH COLUMN |
|---|---|---|---|---|---|---|---|---|---|---|---|---|
| k-TH ROW | 331 | 332 | 333 | 334 | 331 | 332 | 333 | 334 | 331 | 332 | 333 | 334 |
| k+1-TH ROW | 331 | 332 | 333 | 334 | 331 | 332 | 333 | 334 | 331 | 332 | 333 | 334 |
| k+2-TH ROW | 331 | 332 | 333 | 334 | 331 | 332 | 333 | 334 | 331 | 332 | 333 | 334 |
| k+3-TH ROW | 331 | 332 | 333 | 334 | 331 | 332 | 333 | 334 | 331 | 332 | 333 | 334 |
| k+4-TH ROW | 331 | 332 | 333 | 334 | 331 | 332 | 333 | 334 | 331 | 332 | 333 | 334 |
| k+5-TH ROW | 331 | 332 | 333 | 334 | 331 | 332 | 333 | 334 | 331 | 332 | 333 | 334 |
| k+6-TH ROW | 331 | 332 | 333 | 334 | 331 | 332 | 333 | 334 | 331 | 332 | 333 | 334 |
| k+7-TH ROW | 331 | 332 | 333 | 334 | 331 | 332 | 333 | 334 | 331 | 332 | 333 | 334 |
| k+8-TH ROW | 331 | 332 | 333 | 334 | 331 | 332 | 333 | 334 | 331 | 332 | 333 | 334 |
| k+9-TH ROW | 331 | 332 | 333 | 334 | 331 | 332 | 333 | 334 | 331 | 332 | 333 | 334 |
| k+10-TH ROW | 331 | 332 | 333 | 334 | 331 | 332 | 333 | 334 | 331 | 332 | 333 | 334 |
| k+11-TH ROW | 331 | 332 | 333 | 334 | 331 | 332 | 333 | 334 | 331 | 332 | 333 | 334 |

FIG. 12

| | m-TH COLUMN | m+1-TH COLUMN | m+2-TH COLUMN | m+3-TH COLUMN | m+4-TH COLUMN | m+5-TH COLUMN | m+6-TH COLUMN | m+7-TH COLUMN | m+8-TH COLUMN | m+9-TH COLUMN | m+10-TH COLUMN | m+11-TH COLUMN |
|---|---|---|---|---|---|---|---|---|---|---|---|---|
| k-TH ROW | 431 | 432 | 433 | 434 | 431 | 432 | 433 | 434 | 431 | 432 | 433 | 434 |
| k+1-TH ROW | 432 | 433 | 434 | 431 | 432 | 433 | 434 | 431 | 432 | 433 | 434 | 431 |
| k+2-TH ROW | 433 | 434 | 431 | 432 | 433 | 434 | 431 | 432 | 433 | 434 | 431 | 432 |
| k+3-TH ROW | 434 | 431 | 432 | 433 | 434 | 431 | 432 | 433 | 434 | 431 | 432 | 433 |
| k+4-TH ROW | 431 | 432 | 433 | 434 | 431 | 432 | 433 | 434 | 431 | 432 | 433 | 434 |
| k+5-TH ROW | 432 | 433 | 434 | 431 | 432 | 433 | 434 | 431 | 432 | 433 | 434 | 431 |
| k+6-TH ROW | 433 | 434 | 431 | 432 | 433 | 434 | 431 | 432 | 433 | 434 | 431 | 432 |
| k+7-TH ROW | 434 | 431 | 432 | 433 | 434 | 431 | 432 | 433 | 434 | 431 | 432 | 433 |
| k+8-TH ROW | 431 | 432 | 433 | 434 | 431 | 432 | 433 | 434 | 431 | 432 | 433 | 434 |
| k+9-TH ROW | 432 | 433 | 434 | 431 | 432 | 433 | 434 | 431 | 432 | 433 | 434 | 431 |
| k+10-TH ROW | 433 | 434 | 431 | 432 | 433 | 434 | 431 | 432 | 433 | 434 | 431 | 432 |
| k+11-TH ROW | 434 | 431 | 432 | 433 | 434 | 431 | 432 | 433 | 434 | 431 | 432 | 433 |

IMAGE DISPLAY DEVICE AND CAMERA EVALUATION SYSTEM

CROSS REFERENCE TO RELATED APPLICATION

This application is a Continuation of PCT Application No. PCT/JP2018/040126, filed on Oct. 29, 2018, and claims the priority of Japanese Patent Application No. 2018-007921, filed on Jan. 22, 2018, the entire contents of both of which are incorporated herein by reference.

BACKGROUND

The present disclosure relates to an image display device and a camera evaluation system.

When a camera as disclosed in Japanese Unexamined Patent Application Publication No. 2004-247979 newly developed, the camera is evaluated by photographing different places with the camera under development.

SUMMARY

Therefore, since it takes time to perform the evaluation, and the photographing conditions vary depending on weather, a photographing time or the like even in the same place, it is difficult to evaluate the camera with high reproducibility.

A first aspect of one or more embodiments provides an image display device including: a video data processor configured to convert input video data into sub-frame data in which one frame is composed of a plurality of sub-frames; and a liquid crystal display device that comprises a display pixel unit in which a greater number of pixels than the number of pixels of a camera to be evaluated are arranged, and is configured to switch a display image to be captured by the camera for each frame asynchronously with the camera based on the sub-frame data to display the display image in a frame-sequential manner, wherein the video data processor includes: a sub-frame data conversion table which differs for each of a plurality of pixels corresponding to one pixel of the camera; and a sub-frame data converter configured to convert the video data into the sub-frame data for each of the plurality of pixels based on the sub-frame data conversion table.

A second aspect of one or more embodiments provides a camera evaluation system including: an image display device configured to display a display image to be captured by a camera to be evaluated asynchronously with the camera based on input video data; and a data analysis device configured to analyze detection result data generated based on a captured image obtained by the camera capturing the display image, wherein the image display device includes: a video data processor configured to convert the video data into sub-frame data in which one frame is composed of a plurality of sub-frames; and a liquid crystal display device that comprises a display pixel unit in which a greater number of pixels greater than the number of pixels of the camera are arranged, and is configured to switch the display image for each frame based on the sub-frame data to display the display image in a frame-sequential manner, wherein the video data processor includes: a sub-frame data conversion table which differs for each of a plurality of pixels corresponding to one pixel of the camera; and a sub-frame data converter configured to convert the video data into the sub-frame data for each of the plurality of pixels based on the sub-frame data conversion table.

BRIEF DESCRIPTION OF THE DRAWINGS

FIG. 5A is a diagram illustrating an example of a sub-frame data conversion table.

FIG. 5B is a diagram illustrating an example of the sub-frame data conversion table.

FIG. 5C is a diagram illustrating an example or the sub-frame data conversion table.

FIG. 5D is a diagram illustrating an example of the sub-frame data conversion table.

FIG. 6 is a diagram illustrating the relationship between pixels in a display pixel unit and the sub-frame data conversion table corresponding to each pixel.

FIG. 11 is a diagram illustrating a relationship between the pixels of the display pixel unit and the sub-frame data conversion table corresponding to each pixel.

FIG. 12 is a diagram illustrating a relationship between the pixels of the display pixel unit and the sub-frame data conversion table corresponding to each pixel.

DETAILED DESCRIPTION

Figure 1:
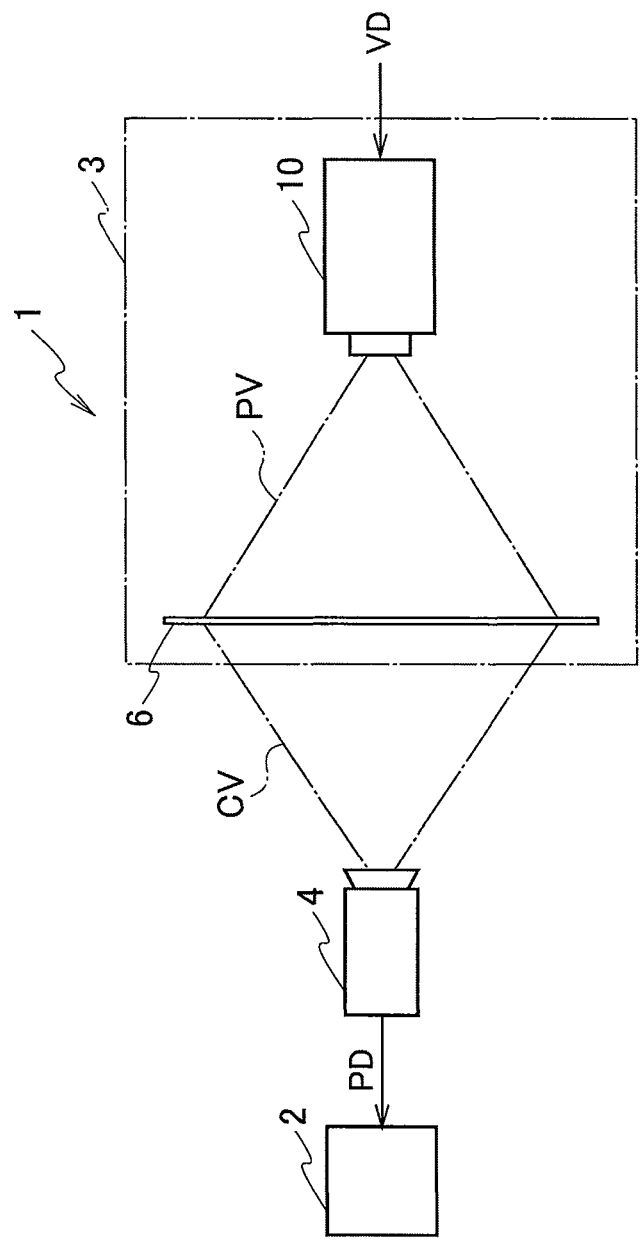
FIG. 1 is a configuration diagram illustrating a camera evaluation system according to one or more embodiments.

A camera evaluation system according to one or more embodiments will be described with reference to FIG. 1. A camera evaluation system 1 for evaluating a camera 4 to be evaluated includes a data analysis device 2 and an image display device 3. The image display device 3 receives, as video data VD, moving images captured under various conditions in different places, different times, different weather, or different seasons.

A case where a projector is used as the image display device 3 will be described. The image display device 3 includes a projector 10 and a screen 6. Video data VD is input to the projector 10. The projector 10 generates a moving image based on the video data VD and projects the moving image on the screen 6. The moving image is projected on the screen 6 as a display image PV.

The camera 4 to be evaluated captures the display image PV projected on the screen 6 as a captured image CV. When the camera 4 is an in-vehicle camera, the camera 4 detects, for example, a center line on the road based on the captured image CV, generates detection result data PD, and outputs the detection result data PD to the data analysis device 2. The data analysis device 2 analyzes the detection result data PD. The camera 4 is evaluated based on the analysis result.

Figure 2:
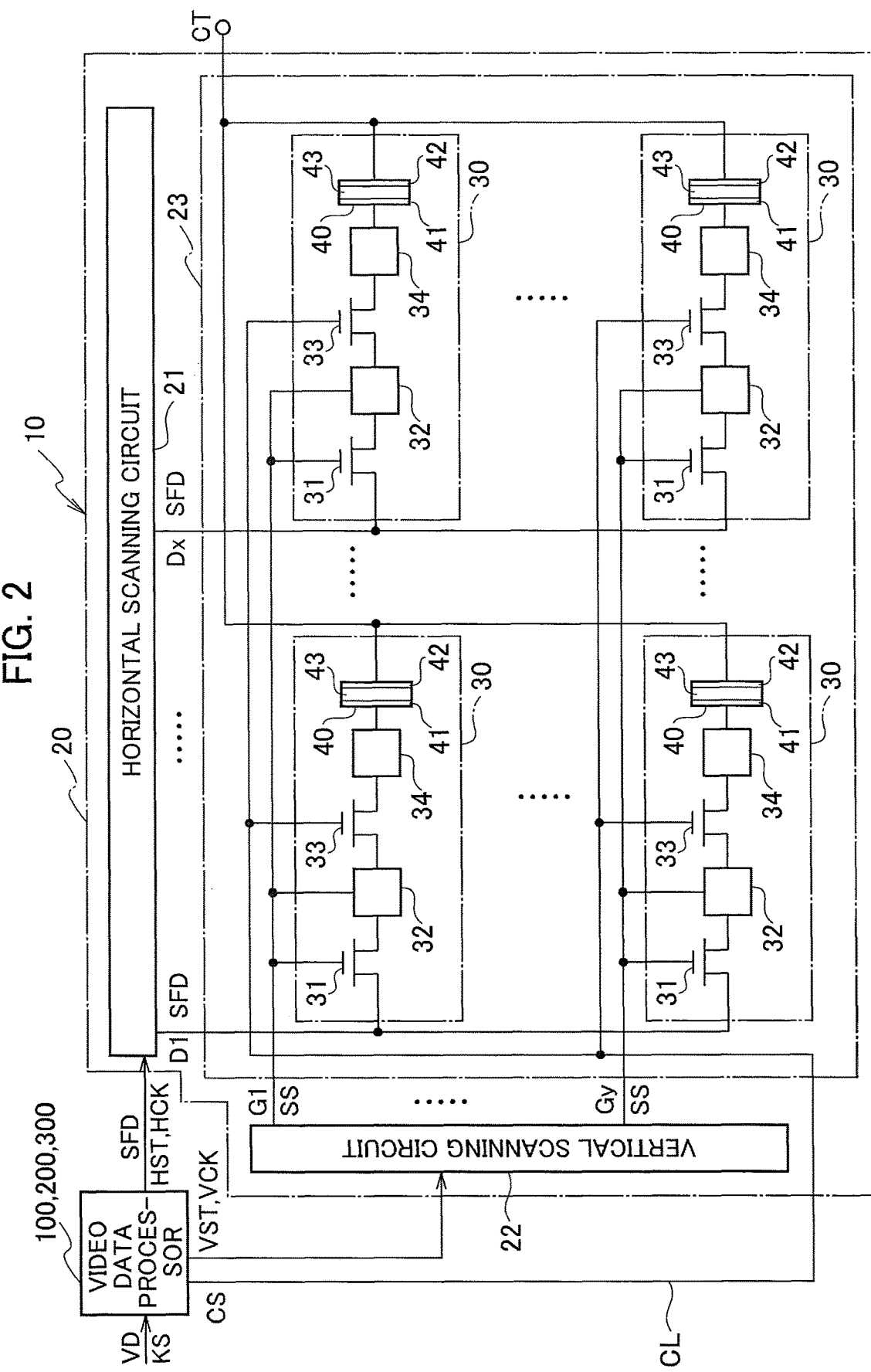
FIG. 2 is a configuration diagram illustrating an image display device (projector) in the camera evaluation system, according to one or more embodiments.

The projector 10 will be described with reference to FIG. 2. The projector 10 includes a video data processor 100 and a liquid crystal display device 20. The video data processor 100 may be configured by software executed by a central processing unit (CPU) or by hardware such as circuit.

The video data VD is input to the video data processor 100 as a digital signal. The video data processor 100 converts the video data VD into sub-frame data SFS in which one frame includes a plurality of sub-frames. The video data processor 100 sequentially outputs the sub-frame data SFD to the liquid crystal display device 20 pixel by pixel. The operation of the video data processor 100 will be described later.

The liquid crystal display device 20 is a frame-sequential active matrix type liquid crystal display device that switches and displays a moving image (display image PV) for each frame. The liquid crystal display device 20 includes a horizontal scanning circuit 21, a vertical scanning circuit 22, and a display pixel unit 23. The sub-frame data SFD is sequentially input to the horizontal scanning circuit 21 from the video data processor 100 pixel by pixel.

The horizontal scanning circuit 21 is connected to a plurality (x) of column data lines D (D1 to Dx) arranged in the horizontal direction. The vertical scanning circuit 22 is connected to a plurality (y) of row scanning lines G (G1 to Gy) arranged in the vertical direction. FIG. 2 illustrates only two column data lines D1 and Dx and two row scanning lines G1 and Gy.

The display pixel unit 23 has a plurality (x×y) of pixels 30 arranged in a matrix at each intersection of the column data line D and the row scanning line G. In FIG. 2, only four pixels 30 are illustrated in correspondence with the two column data lines D1 and Dx and the two row scanning lines G1 and Gy.

The number of pixels (the number of valid pixels) of the display pixel unit 23 of the projector 10 is set to be greater than the number of pixels (the number of valid pixels) of the camera 4. For example, the number of pixels of the camera 4 is 720 in the horizontal direction and 480 in the vertical direction. On the other hand, the number of pixels in the display pixel unit 23 of the projector 10 is 4096 in the horizontal direction and is 2160 in the vertical direction.

Therefore, assuming that the photographing range of the camera 4 is the same as the display range of the projector 10, one pixel in the camera 4 corresponds to 5 pixels or more in the projector 10 in the horizontal direction and corresponds to 4 pixels or more in the projector 10 in the vertical direction. In order to make the description easy to understand, a case where four pixels in the projector 10 correspond to one pixel in the camera 4 in the horizontal direction and the vertical direction will be described.

The pixel 30 includes a switching unit 31 (first switching unit), a sampling-and-holding unit 32 (first sampling-and-holding unit), a switching unit 33 (second switching unit), a sampling-and-holding unit 34 (second sampling-and-holding unit), and a liquid crystal display element 40.

The liquid crystal display element 40 includes a reflective electrode 41, a common electrode 42, and a liquid crystal 43. The reflective electrode 41 is formed for each pixel 30. The common electrode 42 is formed in common for all of the pixels 30. The liquid crystal 43 is filled in a gap (cell gap) between the reflective electrode 41 and the common electrode 42.

The switching units 31 and 33 are configured by N-channel MOS type field effect transistors (hereinafter, referred to as NMOS transistors). The switching unit 31 has a gate connected to the row scanning line G, a drain connected to the column data line D, and a source connected to the input side of the sampling-and-holding unit 32.

The sampling-and-holding unit 32 is configured by a flip-flop having a static random access memory (SRAM) structure, and is connected to the row scanning line G. The sampling-and-holding unit 32 is connected to the column data line D via the switching unit 31.

The switching unit 33 has a gate connected to a control signal line CL, a drain connected to the output side of the sampling-and-holding unit 32, and a source connected to the input side of the sampling-and-holding unit 34. The sampling-and-holding unit 34 is configured by a flip-flop having an SRAM structure, and the output side thereof is connected to the reflective electrode 41 of the liquid crystal display element 40. The common electrode 42 is connected to a common terminal CT.

The operation of the liquid crystal display device 20 will be described. A vertical synchronization signal VST and a vertical shift clock signal VCK are input to the vertical scanning circuit 22 from the video data processor 100. The vertical scanning circuit 22 generates a row selection signal SS based on the vertical synchronization signal VST and the vertical shift clock signal VCK and selects a row scanning line G for each horizontal period. The switching units 31 for one pixel row connected to the selected row scanning line G are simultaneously turned on by the row selection signal SS.

Sub-frame data SFD having a plurality of sub-frames forming one frame is sequentially input to the horizontal scanning circuit 21 from the video data processor 100 pixel by pixel. A horizontal synchronization signal HST and a horizontal shift clock signal HCK are input to the horizontal scanning circuit 21 from the video data processor 100.

The horizontal scanning circuit 21 outputs the sub-frame data SFD to the column data lines D1 to Dx based on the horizontal synchronization signal HST and the horizontal shift clock signal HCK. Thus, the sub-frame data SFD corresponding to each pixel 30 is written to the sampling-and-holding unit 32 of each pixel 30 of the pixel row selected by the vertical scanning circuit 22 via the switching unit 31.

The sampling-and-holding unit 32 samples and holds the sub-frame data SFD. By the vertical scanning circuit 22 selecting all of the pixel row, the video data for one sub-frame comes to be written to the sampling-and-holding units 32 of all of the pixels 30. The switching unit 31 and the sampling-and-holding unit 32 constitute a first holding means.

When the sub-frame data SFD is written to the sampling-and-holding units 32 of all of the pixels 30, the video data processor 100 outputs a control signal CS to the switching units 33 of all of the pixels 30 via the control signal line CL. As a result, the switching units 33 of all of the pixels 30 are turned on and the pieces of sub-frame data SFD for one sub-frame written to the sampling-and-holding unit 32 are simultaneously transmitted to the corresponding sampling-and-holding unit 34 for all of the pixels 30. The switching unit 33 constitutes a transfer means.

The sampling-and-holding unit 34 samples and holds the sub-frame data SFD for one sub-frame. The sub-frame data SFD for one sub-frame is held in each sampling-and-holding unit 34 for one sub-frame period. The sampling-and-holding unit 34 constitutes a second holding means.

A drive voltage corresponding to the sub-frame data SFD is applied to the reflective electrode 41 of the liquid crystal display element 40 by the sampling-and-holding unit 34. The drive voltage applied to the reflective electrode 41 is the ground voltage of the MOS transistor when the sub-frame data SFD held by the sampling-and-holding unit 34 is "0", and is alternatively the power supply voltage of the MOS transistor when the sub-frame data SFD is "1". A common voltage is applied to all of the pixels 30 from a common terminal CT to the common electrode 42 of the liquid crystal display element 40.

The liquid crystal 43 is driven according to the potential difference between the reflective electrode 41 and the common electrode 42. When illumination light is applied to the display pixel unit 23 from outside, the illumination light is modulated for each pixel 30 and the modulated illumination light is displayed as an image.

The liquid crystal display device 20 holds the sub-frame data SFD for one sub-frame in the sampling-and-holding units 34 of all of the pixels 30 for one sub-frame period. The liquid crystal display device 20 sequentially writes the sub-frame data SFD for the next one sub-frame to the sampling-and-holding units 32 of all of the pixels 30 within one sub-frame period. Thereby, the liquid crystal display device 20 can display the display image PV in a frame-sequential manner.

It is assumed that only the evaluation result PD is output from the camera 4 to be evaluated and a signal such as a video signal or a synchronization signal required for synchronizing an external device is not output. It is also assumed that the camera 4 does not have a function of receiving a synchronization signal from an external device and causing the external device to synchronize with the camera. Therefore, the projector 10 and the camera 4 are not easily synchronized.

Therefore, by assuming that the camera 4 and the projector 10 are asynchronous, the operation. of the video data processor 100 for the camera 4 to capture the display image PV projected from the projector 10 with good reproducibility will be described in Examples 1 and 2.

EXAMPLE 1

With reference to FIGS. 3, 4, 5A to 5D, 6, 7, 8, 9, and 10, a case where one pixel group includes four pixels 30 arrayed in the vertical direction (row direction) in the display pixel unit 23 will be described.

Figure 3:
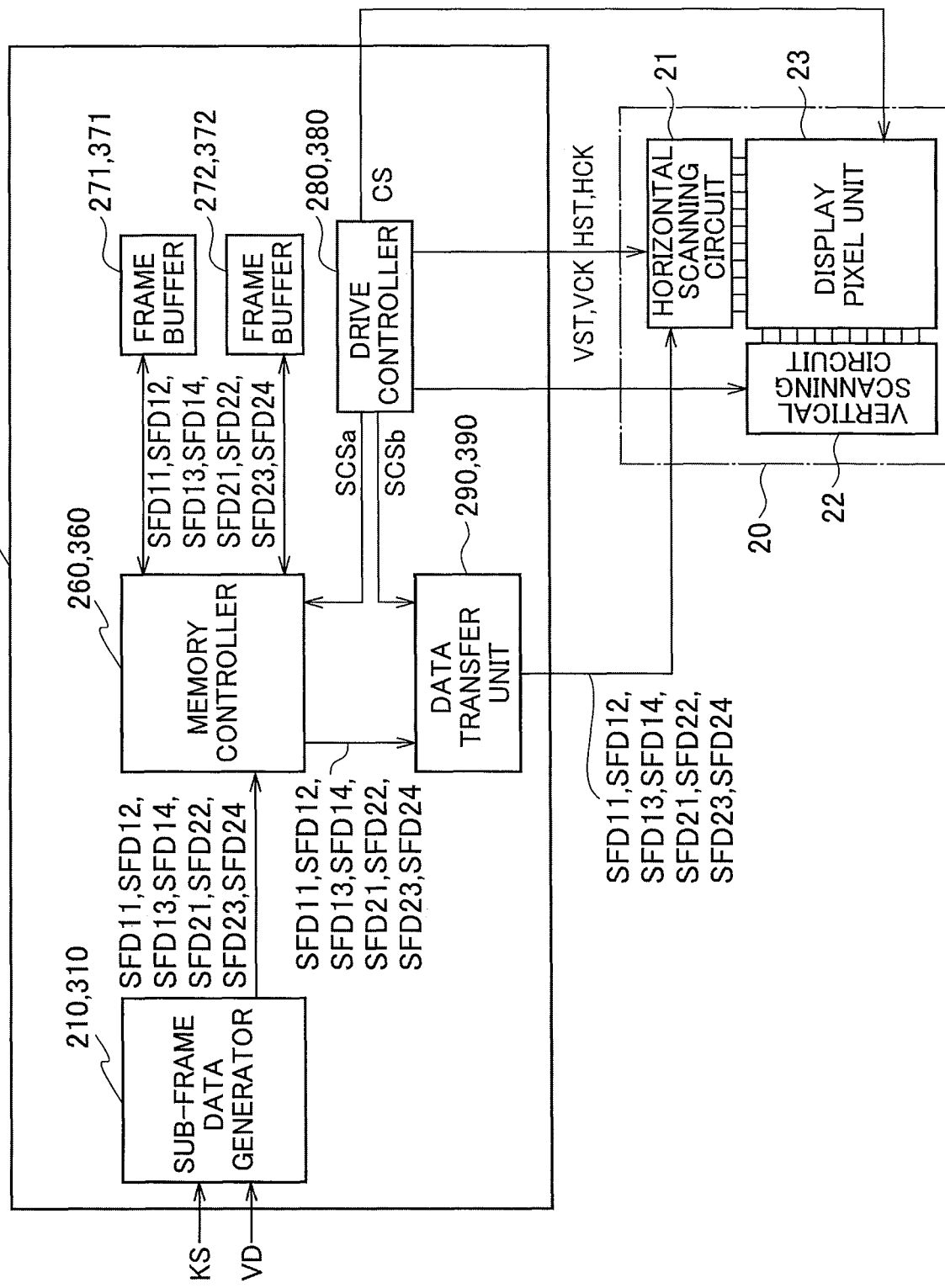
FIG. 3 is a configuration diagram illustrating an example of a video data processor of the projector.

A video data processor 200 of Example 1 illustrated in FIG. 3 corresponds to the video data processor 100 described above, and includes a sub-frame data generator 210, a memory controller 260, frame buffers 271 and 272, a drive controller 280, and a data transfer unit 290. The video data VD and a switching control signal KS are input to the sub-frame data generator 210.

Figure 4:
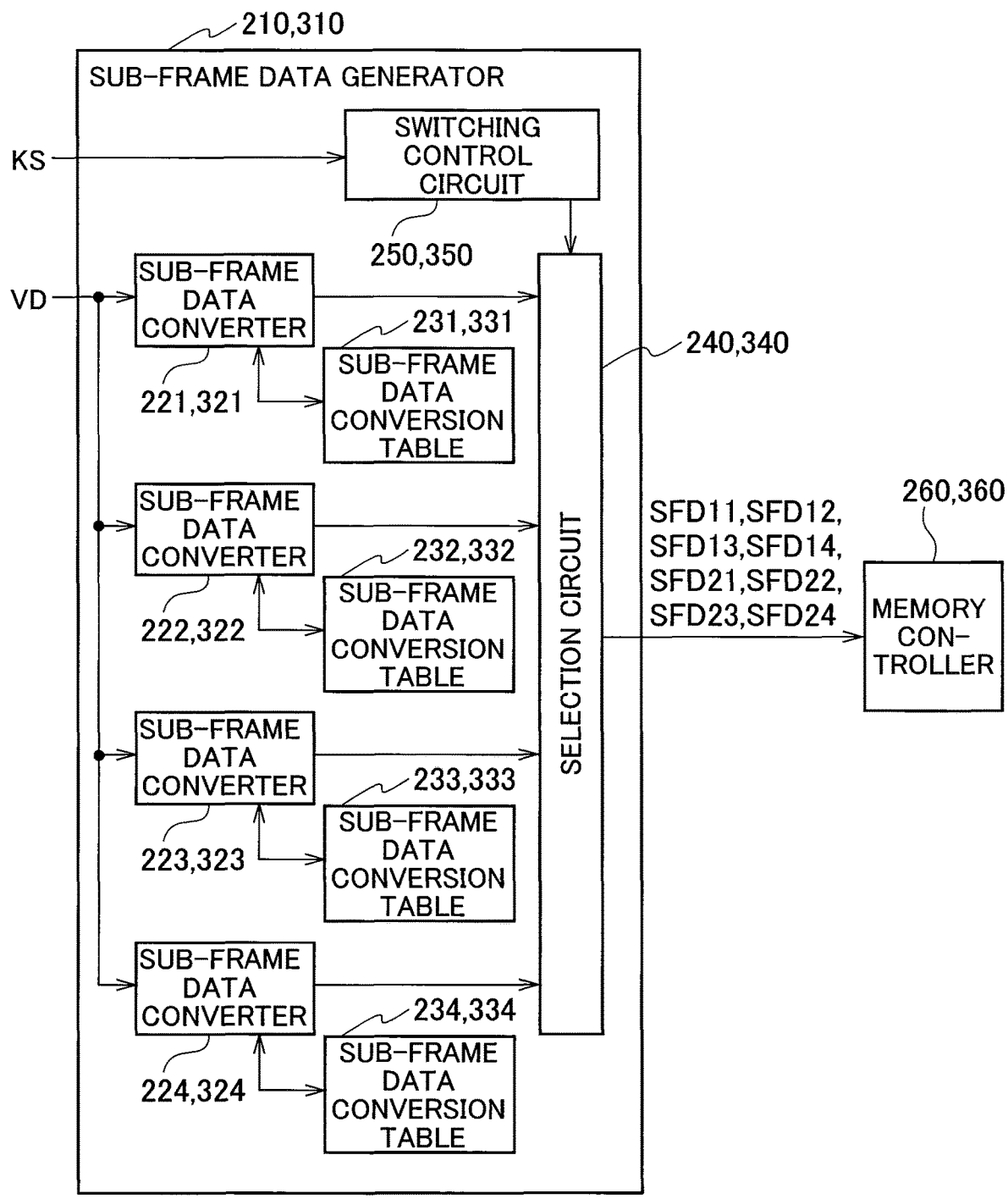
FIG. 4 is a configuration diagram illustrating an example of a sub-frame data generator of the video data processor.

As illustrated in FIG. 4, the sub-frame data generator 210 includes a plurality of sub-frame data converters 221, 222, 223, and 224, a plurality of different sub-frame data conversion tables 231, 232, 233, and 234, a selection circuit 240, and a switching control circuit 250. The sub-frame data conversion tables 231, 232, 233, and 234 are set to correspond to the respective pixels 30 forming a pixel group.

The switching control signal KS is input to the switching control circuit 250. The video data VD is input to the sub-frame data converters 221, 222, 223, and 224. The video data VD is n-bit gradation data.

The switching control circuit 250 controls the selection circuit 240 based on the switching control signal KS. The selection circuit 240 sequentially selects the pixel $30k$ in the k-th row (k is a positive integer), the pixel $30k+1$ in the k+1-th row, the pixel $30k+2$ in the k+2-th row, and the pixel $30k+3$ in the k+3-th row, which form one pixel group.

The sub-frame data converter 221 is selected by the selection circuit 240, converts the video data VD to sub-frame data SFD11 composed of $2^n$ sub-frames SF based on the sub-frame data conversion table 231, and outputs the sub-frame data SFD11 to the memory controller 260.

The sub-frame data converter 222 is selected by the selection circuit 240, converts the video data VD into sub-frame data SFD12 composed of $2^n$ sub-frames SF based on the sub-frame data conversion table 232, and outputs the sub-frame data SFD12 to the memory controller 260.

The sub-frame data converter 223 is selected by the selection circuit 240, converts the video data VD to sub-frame data SFD13 composed of $2^n$ sub-frames SF based on the sub-frame data conversion table 233, and outputs the sub-frame data SFD13 to the memory controller 260.

The sub-frame data converter 224 is selected by the selection circuit 240, converts the video data VD to sub-frame data SFD14 composed of $2^n$ sub-frames SF based on the sub-frame data conversion table 234, and outputs the sub-frame data SFD14 to the memory controller 260.

As illustrated in FIG. 3, the memory controller 260 sequentially writes the pieces of sub-frame data SFD11 to SFD14 in one frame buffer 271. When the pieces of sub-frame data SFD11 to SFD14 for one sub-frame are written to the frame buffer 271, the memory controller 260 writes the pieces of sub-frame data SFD11 to SFD14 for the next one sub-frame in the other frame buffer 272, and the pieces of sub-frame data SFD11 to SFD11 for one sub-frame written in the frame buffer 271 are read and output to the data transfer unit 290.

With the double buffer configuration. including the frame buffers 271 and 272, the memory controller 260 can alternately execute writing and reading of the pieces of sub-frame data SFD11 to SFD14 to and from the frame buffers 271 and 272. The data transfer unit 290 outputs the pieces of sub-frame data SFD11 to SFD14 to the horizontal scanning circuit 21.

The drive controller 280 outputs a synchronization control signal SCSa to the memory controller 260 and outputs a synchronization control signal SCSb to the data transfer unit 290. The drive controller 280 also outputs the vertical synchronization signal VST and the vertical shift clock signal VCK to the vertical scanning circuit 22, and outputs the horizontal synchronization signal HST and the horizontal shift clock signal HCK to the horizontal scanning circuit 21.

The drive controller 280 controls operation timings of the memory controller 260, the data transfer unit 290, the vertical scanning circuit 22, and the horizontal scanning circuit 21 by using the synchronization control signals SCSa and SCSb, the vertical synchronization signal VST, the vertical shift clock signal VCK, the horizontal synchronization signal HST, and the horizontal shift clock signal HCK. As a result, the pieces of sub-frame data SFD11 to SFD14 are input to each pixel 30 constituting the display pixel unit 23.

FIGS. 5A, 5B, 5C, and 5D each illustrates an example of the relationship between a gradation value in the sub-frame data conversion tables 231, 232, 233, and 234 and a data value of the sub-frame SF. The reference numerals SF1 to SF8 illustrated in FIGS. 5A to 5D indicate sub-frame numbers, and the data value of the sub-frame for each gradation value is indicated as 0 or 1.

A data value of 1 corresponds to a display period in the pixel 30, and a data value of 0 corresponds to a non-display period in the pixel 30. In FIGS. 5A to 5D, in order to make the description easy to understand, a case where the number of gradations is eight and one frame is composed of eight sub-frames SF is illustrated. The number of gradations and the number of sub-frames are not limited to those in Example 1, but may be set as appropriate.

The sub-frame data conversion tables 231, 232, 233, and 234 are set so that the sub-frame number at which the gradation value first increases is different. For example, as illustrated in FIG. 5A, the sub-frame data conversion table 231 is set so that the gradation value increases from the sub-frame SF1. As illustrated in FIG. 5B, the sub-frame data conversion table 232 is set so that the gradation value increases from the sub-frame SF3.

As illustrated in 5C, the sub-frame data conversion table 233 is set so that the gradation value increases from the sub-frame SF5. As illustrated in FIG. 5D, the sub-frame data conversion table 234 is set so that the gradation value increases from the sub-frame SF7.

FIG. 6 illustrates a relationship between the pixels 30 of the display pixel unit 23 and the sub-frame data conversion tables 231 to 234 corresponding to the respective pixels 30. The reference numerals 231, 232, 233, and. 234 in FIG. 6 indicate sub-frame data. conversion tables corresponding to the respective pixels 30. FIG. 6 illustrates the pixels 30 in the k-th to k+11-th rows and the m-th to m+11-th columns. As illustrated in FIG. 6, in Example 1 in which the plurality of pixels 30 arrayed in the vertical direction (row direction) in the display pixel unit 23 constitute one pixel group, the same sub-frame data conversion table is used for the individual pixels 30 in the horizontal direction (column direction), and different sub-frame data conversion tables in the pixel group are used for the individual pixels 30 in the vertical direction.

Figure 7:
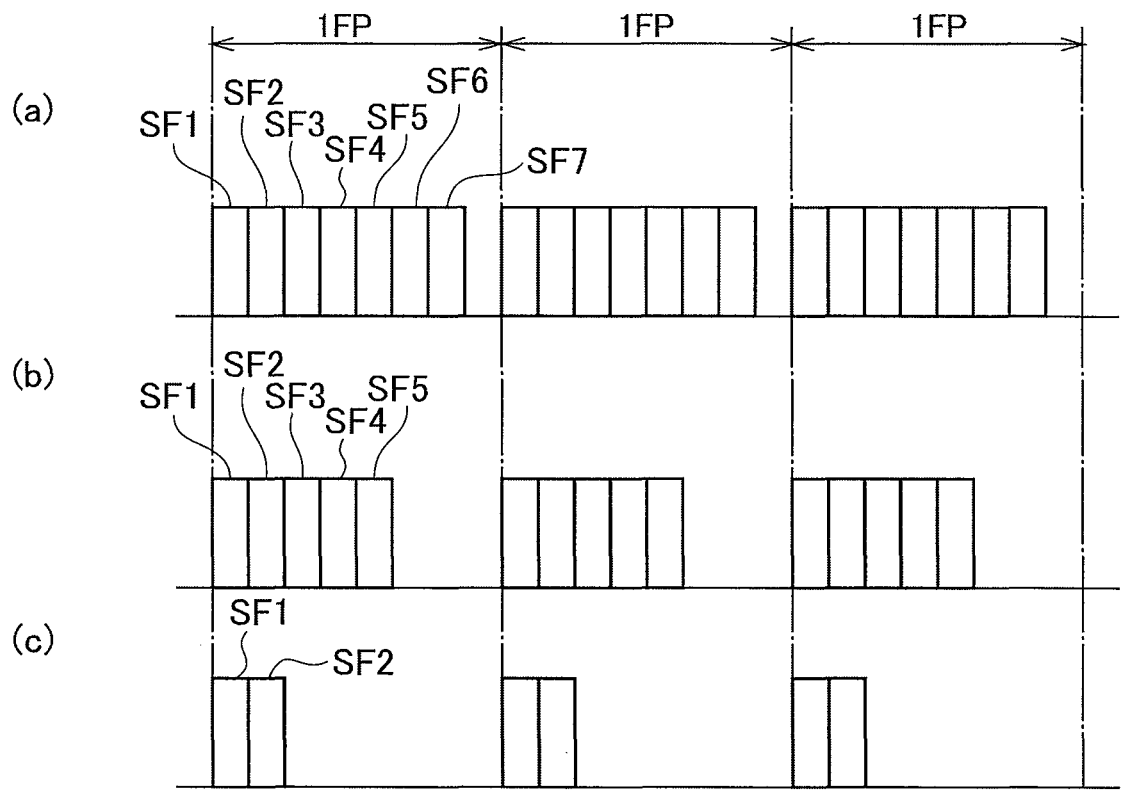
FIG. 7 is a diagram illustrating a case where the video data processor converts video data into sub-frame data based on the same sub-frame data conversion table.

As a comparative example of Example 1, a case where the video data processor 200 converts the video data VD into the sub-frame data SFD based on the same sub-frame data. conversion table will be described. (a) to (c) of FIG. 7 illustrate a case where the video data processor 200 converts the video data VD into the sub-frame data SFD based on the sub-frame data conversion table 231 illustrated in FIG. 5A. (a) of FIG. 7 illustrates the sub-frame data SFD when the gradation value is 7. (b) of FIG. 7 illustrates the sub-frame data SFD when the gradation value is 5. (c) of FIG. 7 illustrates the sub-frame data SFD when the gradation value is 2.

Figure 8:
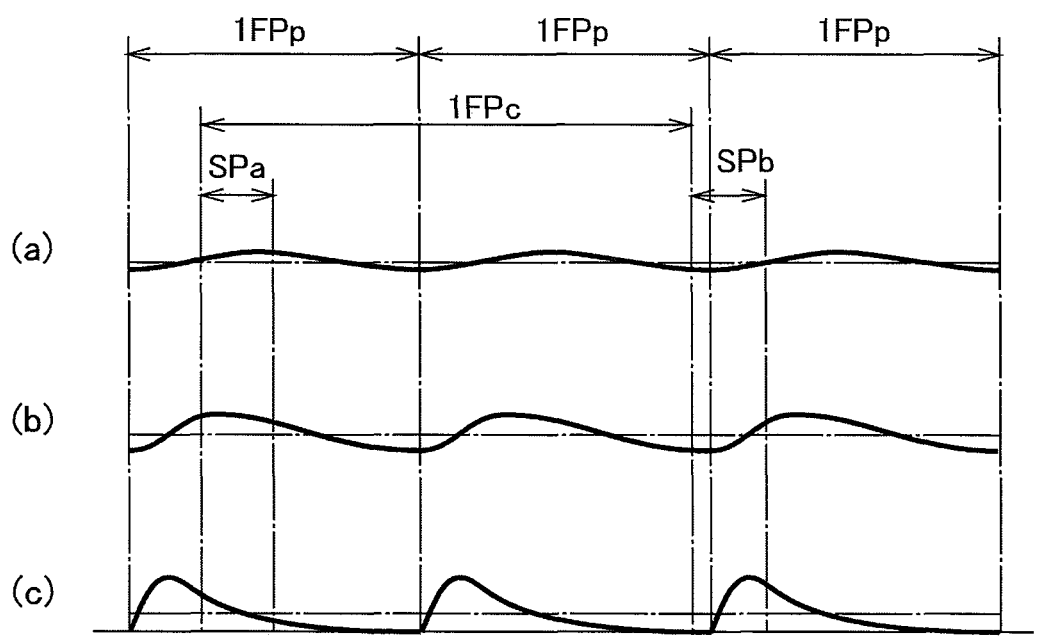
FIG. 8 is a diagram illustrating the response characteristics of the liquid crystal to the sub-frame data illustrated in FIG. 7.

(a) to (c) of FIG. 8 illustrate response characteristics of the liquid crystal 43 to the sub-frame data SFD. Each vertical axis in (a) to (c) of FIG. 8 represents the intensity of output light of the liquid crystal 43. The reference numeral 1FPp illustrated in (a) to (c) of FIG. 8 indicates one frame period of the projector 10. The reference numeral 1FPp corresponds to the reference numeral 1FP illustrated in FIG. 7. The reference numeral 1FPc indicates one frame period of the camera 4. The reference numerals SPa and SPb indicate the exposure time of the camera 4. (a) to (c) of FIG. 8 respectively correspond to (a) to (c) of FIG. 7.

As illustrated in (a) of FIG. 8, when the gradation value is high, the display period of the sub-frames SF in one frame is long, and thus, a pulsation of the liquid crystal 43 (a fluctuation in the intensity of the output light in one frame period) is small. On the other hand, as illustrated in (c) of FIG. 8, when the gradation value is low, the display period of the sub-frames SF in one frame is short, and thus, the pulsation. of the liquid crystal 43 is large. As illustrated in (b) of FIG. 8, at an intermediate gradation value, the pulsation of the liquid crystal 43 has an intermediate magnitude.

When the camera 4 is used as an outdoor camera such as an in-vehicle camera or a wirelessly controlled drone, which is referred to as a drone, photographing is performed at outdoors that is a brighter environment compared to indoors. When photographing is performed in a bright environment, the exposure time of the camera. 4 becomes short. Therefore, when the camera 4 and the projector 10 are asynchronous, as illustrated in (a) to (c) of FIG. 8, the image captured at the exposure time SPa and the image captured at the exposure time SPb have different exposure amounts. In particular, when the number of gradations is low as illustrated in (c) of FIG. 8, the exposure amount is greatly different.

As a result, in accordance with the pulsation response of the liquid crystal 43, a phenomenon called a beat, such as a luminance variation for each frame or a light and dark stripe, occurs in the image captured by the camera 4. The beat becomes more conspicuous as the gradation value is smaller and the exposure time SP is shorter.

The projector 10 of Example 1 converts the video data VD into the pieces of sub-frame data SFD11, SFD12, SFD13, and SFD14 based on the different sub-frame data conversion tables 231, 232, 233, 24.

Figure 9:
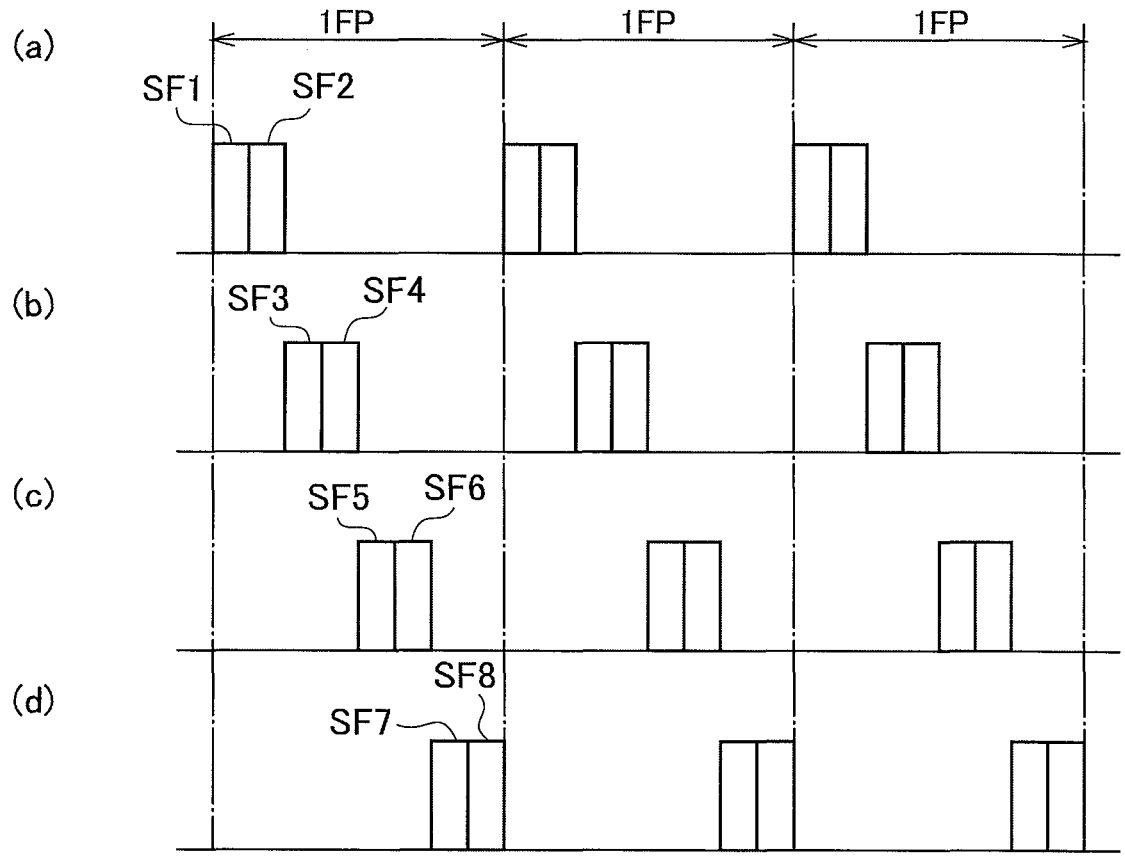
FIG. 9 is a diagram illustrating a case where sub-frame data converters corresponding to a plurality of pixels forming a pixel group convert video data into sub-frame data based on different sub-frame data conversion tables.

(a) to (d) of FIG. 9 illustrate a case where the video data processor 200 converts the video data VD into the pieces of sub-frame data SFD11 to SFD14 based on the sub-frame data conversion. tables 231 to 234 illustrated in FIGS. 5A to 5D.

(a) of FIG. 9 illustrates the sub-frame data SFD11 of the pixel 30k in the k-th row. (b) of FIG. 9 illustrates the sub-frame data SFD12 of the pixel 30k+1 in the k+1-th. row. (c) of FIG. 9 illustrates the sub-frame data SFD13 of the pixel 30k+2 in the k+2-th row. (d) of FIG. illustrates the sub-frame data SFD14 of the pixel 30k+3 in the k+3-th row. (a) to (d) of FIG. 9 illustrate the pieces of sub-frame data SFD11 to SFD14 when the gradation value is 2. The four pixels 30k, 30k+1, 30k+2, and 30k+3 arranged vertically in the projector 10 correspond to one pixel in the camera 4 in the vertical direction.

Based on the different. sub-frame data conversion tables 231 to 234, the video data processor 200 converts the video data VD into the pieces of sub-frame data SFD11 to SFD14 in which a timing of a display period of the sub-frames SF in one frame period 1FP is different for each of the four pixels 30 that are arranged in the vertical direction (row direction) and constitute one pixel group.

For example, when the gradation value is 2, the display period of the pixel 30k is the period. of the sub-frames SF1 and SF2. For the pixel 30k+1, the period of the sub-frames SF3 and SF4 is the display period. For the pixel 30k+2, the period of the sub-frames SF5 and SF6 is the display period. For the pixel 30k+3, the period of the sub-frames SF7 and SF8 is the display period. That is, the sub-frames SF1 to SF8 constituting one frame are in the display period in any of the pixels 30k to 30k+3 corresponding to one pixel of the camera 4.

Figure 10:
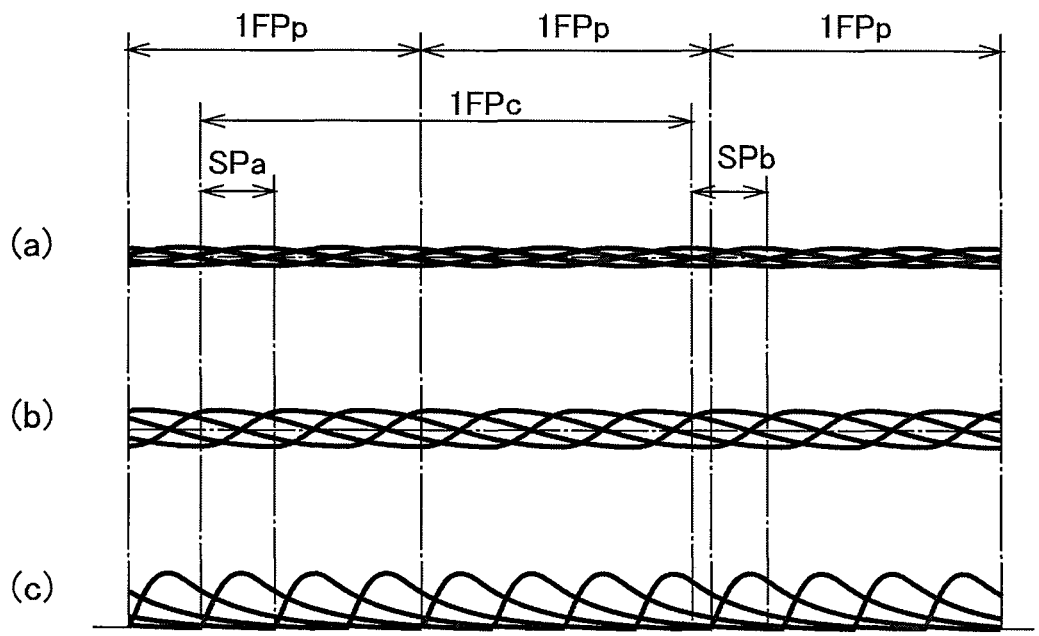
FIG. 10 is a diagram illustrating the response characteristics of the liquid crystal to the sub-frame data of the plurality of pixels illustrated in FIG. 9.

(a) to (c) of FIG. 10 illustrate the response characteristics of the liquid crystal 43 to the pieces of sub-frame data SFD11 to SFD14. (a) to (c) of FIG. 10 respectively correspond to (a) to (c) of FIG. 8. The video data processor 200 uses different sub-frame data conversion tables 231 to 234 to make the timing of the display period of the sub-frame SF different for each of the four vertically arranged pixels 30 constituting one pixel group. As a result, a pulsation response timing of the liquid crystal 43 can be dispersed. Therefore, it is possible to reduce a difference in the exposure amount between the image captured at the exposure time SPa and the image captured at the exposure time SPb. Thus, the occurrence of beats can be suppressed.

EXAMPLE 2

With reference to FIGS. 5A to 5D, 7, 8, 9, 10, and 11, a case where the four pixels 30 arranged in the display pixel unit 23 in the horizontal direction (column direction) constitute one pixel group will be described.

A video data processor 300 of Example 2 illustrated in FIG. 3 corresponds to the video data processor 100, and includes a sub-frame data generator 310, a memory controller 360, frame buffers 371 and 372, a drive controller 380, and a data transfer unit 390. The video data VD and the switching control signal KS are input to the sub-frame data generator 310.

As illustrated in FIG. 4, the sub-frame data generator 310 includes a plurality of sub-frame data converters 321, 322, 323, and 324, a plurality of different sub-frame data conversion tables 331, 332, 333, and 334, a selection circuit 340, and a switching control circuit 350. The sub-frame data conversion. tables 331, 332, 333, and 334 are set so as to correspond to each pixel 30 constituting the pixel group.

The switching control signal KS is input to the switching control circuit 350. The video data VD is input to the sub-frame data converters 321, 322, 323, and 324. The video data VD is n-bit gradation data.

The switching control circuit 350 controls the selection circuit 340 based on the switching control signal KS. The selection circuit 340 sequentially selects a pixel 30$m$ in an m-th column (m is a positive integer), a pixel 30$m$+1 in an m+1-th column, a pixel 30$m$+2 in an m+2-th column, and. a pixel 30$m$+3 in an m+3-th column, which constitute one pixel group.

The sub-frame data converter 321 is selected by the selection circuit. 340, converts the video data VD into sub-frame data SFD21 composed of $2^n$ sub-frames SF based on the sub-frame data conversion table 331, and outputs the sub-frame data SFD21 to the memory controller 360.

The sub-frame data converter 322 is selected by the selection. circuit 340, converts the video data VD into sub-frame data SFD22 composed of $2^n$ sub-frames SF based on the sub-frame data conversion table 332, and outputs the sub-frame data SFD22 to the memory controller 360.

The sub-frame data converter 323 is selected by the selection circuit 340, converts the video data VD into sub-frame data SFD23 composed of $2^n$ sub-frames SF based on the sub-frame data conversion table 333, and outputs the sub-frame data SFD23 to the memory controller 360.

The sub-frame data converter 324 is selected by the selection circuit 340, converts the video data VD into sub-frame data SFD24 composed of $2^n$ sub-frames SF based on the sub-frame data conversion table 334, and outputs the sub-frame data SFD24 to the memory controller 360.

As illustrated in FIG. 3, the memory controller 360 sequentially writes the pieces of sub-frame data SFD21 to SFD24 in one frame buffer 371. After the pieces of sub-frame data SFD21 to SFD24 for one sub-frame are written in the frame buffer 371, the memory controller 360 writes the pieces of sub-frame data SFD21 to SFD24 for the next one sub-frame in the other frame buffer 372, and the pieces of sub-frame data SFD21 to SFD24 for one sub-frame written in the frame buffer 371 are read and output to the data transfer unit 390.

With the double buffer configuration including the frame buffers 371 and 372, the memory controller 360 can alternately execute writing and reading of the pieces of sub-frame data SFD21 to SFD24 to and from the frame buffers 371 and 372. The data transfer unit 390 outputs the pieces of sub-frame data SFD21 to SFD24 to the horizontal scanning circuit 21.

The drive controller 380 outputs the synchronization control signal SCSa to the memory controller 360, and outputs the synchronization control signal SCSb to the data transfer unit 390. The drive controller 380 also outputs the vertical synchronization signal VST and the vertical shift clock signal VCK to the vertical scanning circuit 22, and outputs the horizontal synchronization signal HST and the horizontal shift clock signal HCK to the horizontal scanning circuit 21.

The drive controller 380 controls operation timings of the memory controller 360, the data transfer unit 390, the vertical scanning circuit 22, and the horizontal scanning circuit 21 by using the synchronization control signals SCSa and SCSb, the vertical synchronization signal VST, the vertical shift clock signal VCK, the horizontal synchronization signal HST, and the horizontal shift clock signal HCK. As a result, the pieces of sub-frame data SFD21 to SFD24 are input to each pixel 30 constituting the display pixel unit 23.

FIGS. 5A, 5B, 5C, and 5D illustrate examples of the relationship between the gradation value in the sub-frame data conversion tables 331, 332, 333, and 334 and a data value of the sub-frame SF.

The sub-frame data conversion tables 331 to 334 are set so that sub-frame numbers at which a gradation values first increase are different. For example, as illustrated in FIG. 5A, the sub-frame data conversion table 331 is set so that the gradation value increases from the sub-frame SF1. As illustrated in FIG. 5B, the sub-frame data conversion table 332 is set so that the gradation value increases from the sub-frame SF3.

As illustrated in FIG. 5C, the sub-frame data conversion table 333 is set so that the gradation value increases from the sub-frame SF5. As illustrated in FIG. 5D, the sub-frame data conversion table 334 is set so that the gradation value increases from the sub-frame SF7.

FIG. 11 illustrates a relationship between the pixels 30 of the display pixel unit 23 and the sub-frame data conversion tables 331 to 334 corresponding to the individual pixels 30. Reference numerals 331, 332, 333, and 334 in FIG. 11 indicate sub-frame data conversion tables corresponding to the individual pixels 30. FIG. 11 corresponds to FIG. 6.

As illustrated in FIG. 11, in Example 2 in which the plurality of pixels 30 arrayed in the horizontal direction (column direction) in the display pixel unit 23 constitute one pixel group, the same sub-frame data conversion table is used for the individual pixels 30 in the vertical direction (row direction), and different sub-frame data conversion tables in the pixel group are used for the individual pixels 30 in the horizontal direction.

As a comparative example of Example 2, a case where the video data processor 300 converts the video data VD into the sub-frame data SFD based on the same sub-frame data conversion table will be described. (a) to (c) of FIG. 7 illustrate a case where the video data processor 300 converts the video data VD into the sub-frame data SFD based on the sub-frame data conversion table 331 illustrated in FIG. 5A.

(a) to (c) of FIG. 8 illustrate response characteristics of the liquid crystal 43 to the sub-frame data SFD. Each vertical axis in (a) to (c) of FIG. 8 represents the intensity of output light of the liquid crystal 43. As illustrated in (a) of FIG. 8, when a gradation value is high, a display period of the sub-frames SF in one frame is long, and thus, a pulsation of the liquid crystal 43 is small. On the other hand, as illustrated in (c) of FIG. 8, when the gradation value is low, the display period of the sub-frames SF in one frame is short, and thus, the pulsation of the liquid crystal 43 is large. As illustrated in (b) of FIG. 8, at an intermediate gradation value, the pulsation of the liquid crystal 43 has an intermediate magnitude.

When the camera 4 is used as an outdoor camera such as an in-vehicle camera or a wirelessly controlled drone, which is referred to as a drone, photographing is performed outdoors that is a brighter environment compared to indoors. When photographing is performed in a bright environment, an exposure time of the camera 4 becomes short. Therefore, when the camera 4 and the projector 10 are asynchronous, as illustrated in (a) to (c) of FIG. 8, an image captured at an exposure time SPa and an image captured at an exposure time SPb have different exposure amounts. In particular, when the number of gradations is small as illustrated in (c) of FIG. 8, the exposure amount is greatly different.

As a result, in accordance with a pulsation response of the liquid crystal 43, a phenomenon called a beat, such as a luminance variation for each frame or a light and dark stripe, occurs in the image captured by the camera 4. The beat becomes more conspicuous as the gradation value is smaller and the exposure time SP is shorter.

The projector 10 of Example 2 converts the video data VD into the pieces of sub-frame data SFD21 to SFD24 based on the different sub-frame data conversion tables 331 to 334.

(a) to (d) of FIG. 9 illustrate a case in which the video data processor 300 converts the video data VD into the pieces of sub-frame data SFD21 to SFD24 based on the sub-frame data conversion tables 331 to 334 illustrated in FIGS. 5A to 5D.

(a) of FIG. 9 illustrates the sub-frame data SFD21 of the pixel 30m in the m-th column (b) of FIG. 9 illustrates the sub-frame data SFD22 of the pixel 30m+1 in the m+1-th column. (c) of FIG. 9 illustrates the sub-frame data SFD23 of the pixel 30m+2 in the m+2-th column. (d) of FIG. 9 illustrates the sub-frame data SFD24 of the pixel 30m+3 in the m+3-th column. (a) to (d) of FIG. 9 illustrate the pieces of sub-frame data SFD21 to SFD24 when the gradation value is two. The four pixels 30m, 30m+1, 30m+2, and 30m+3 arranged horizontally in the projector 10 correspond to one pixel in the camera 4 in the horizontal direction.

Based on the different sub-frame data conversion tables 331 to 334, the video data processor 300 converts the video data VD into the pieces of sub-frame data SFD21 to SFD24 which a timing of a display period of the sub-frames SF in one frame period 1FP is different for each of the four pixels 30 that are arranged in the horizontal direction (column direction.) and constitute one pixel group.

For example, when the gradation value is 2, the display period of the pixel 30m is the period of the sub-frames SF1 and SF2. For the pixel 30m+1, the period of the sub-frames SF3 and SF4 is the display period. For the pixel 30m+2, the period of the sub-frames SF5 and SF6 is the display period. For the pixel 30m+3, the period of the sub-frames SF7 and SF8 is the display period. That is, the sub-frames SF1 to SF8 constituting one frame are in the display period in any of the pixels 30m to 30m+3 corresponding to one pixel of the camera 4.

(a) to (c) of FIG. 10 illustrate response characteristics of the liquid crystal 43 to the pieces of sub-frame data SFD21 to SFD24. The video data processor 300 uses different sub-frame data conversion tables 331 to 334 to make a timing of the display period of the sub-frames SF different for each of the four horizontally arranged pixels 30 constituting one pixel group. As a result, a pulsation response timing of the liquid crystal 43 can be dispersed. Therefore, it is possible to reduce the difference in an exposure amount between an image captured at an exposure time SPa and an image captured at an exposure time SPb. Thus, the occurrence of beats can be suppressed.

EXAMPLE 3

In Example 1, the plurality of pixels 30 arranged in the vertical direction form one pixel group, and in Example 2, the plurality of pixels 30 arranged in the horizontal direction form one pixel group. Example 3 is a combination of the vertical direction (Example 1) and the horizontal direction (Example 2). Therefore, differences from Examples 1 and 2 will be described with reference to FIGS. 5A to 5D and 12. The components other than the differences and the signal processing method are the same as those in Examples 1 and 2.

FIGS. 5A, 5B, 5C, and 5D illustrate an example of a relationship between a gradation value in sub-frame data conversion tables 431, 432, 433, and 434 of Example 3 and a data value of the sub-frame SF.

The sub-frame data conversion tables 431 to 434 are set so that the sub-frame numbers at which the gradation values first increase are different. For example, as illustrated in FIG. 5A, the sub-frame data conversion table 431 is set so that the gradation value increases from the sub-frame SF1. As illustrated in FIG. 5B, the sub-frame data conversion table 432 is set so that the gradation value increases from the sub-frame SF3.

As illustrated in FIG. 5C, the sub-frame data conversion table 433 is set so that the gradation value increases from the sub-frame SF5. As illustrated in FIG. 5D, the sub-frame data conversion table 434 is set so that the gradation value increases from the sub-frame SF7.

FIG. 12 illustrates a relationship between the pixels 30 of the display pixel unit 23 and the sub-frame data conversion tables 431 to 434 corresponding to the respective pixels 30. The reference numerals 431, 432, 433, and 434 in FIG. 12 indicate sub-frame data conversion tables corresponding to the respective pixels 30. FIG. 12 corresponds to FIGS. 6 and 11. As illustrated in FIG. 12, different sub-frame data conversion tables are used in the pixel group for the plurality of pixels 30 arranged in the vertical direction (row direction) and the horizontal direction (column direction) in the display pixel unit 23.

The projector 10 according to Example 3 converts the video data VD into the sub-frame data SFD based on the different sub-frame data conversion tables 431 to 434. Thereby, a timing of a display period of the sub-frames SF can be made different for each of the four pixels 30 arranged in the vertical direction and the horizontal direction. Therefore, a pulsation response timing of the liquid crystal 43 can be dispersed. Therefore, it is possible to reduce the difference in an exposure amount between an image captured at an exposure time SPa and an image captured at an exposure time SPb. Thus, the occurrence of beats can be suppressed.

As described above, in the image display device 3 and the camera evaluation system 1, the projector 10 included in the image display device 3 includes the display pixel unit 23 having a greater number of pixels than the camera 4. The camera evaluation system 1 changes a timing of a display period of the sub-frame SF for each of the pixels 30 arranged in the vertical direction, or the horizontal direction, or both the vertical direction and the horizontal direction. As a result, a pulsation response timing of the liquid crystal 43 can be dispersed. Therefore, it is possible to reduce the difference in an exposure amount of images captured at the exposure times SP at different timings, and thus the occurrence of beats can be suppressed.

In the image display device 3 and the camera evaluation system 1, when the camera 4 and the projector 10 are asynchronous, the timing of the display period of the sub-frames SF is made different for each of the pixels 30 constituting a pixel group. As a result, an influence of the timing of the exposure time SP of the camera 4 is reduced, so that the occurrence of beats can be suppressed. Therefore, in accordance with the image display device 3 and the camera evaluation system 1 according to one or more embodiments described above, the camera can be evaluated with good reproducibility.

The present invention is not limited to one or more embodiments described above, and various modifications can be made within a scope not departing a scope of the present invention.

The case where the gradation values of the pixels 30$k$ to 30$k$+3 are the same (the gradation value=2) in the image display device 3 and the camera evaluation system 1 has been described. However, the video data processor 200 may be set such that the gradation values of the individual pixels 30$k$ to 30$k$+3 are different and an average gradation value of the pixels 30$k$ to 30$k$+3 becomes a target gradation value. Similarly, the video data processor 300 may be set such that gradation values of the individual pixels 30$m$ to 30$m$+3 are different and an average gradation value of the pixels 30$m$ to 30$m$+3 becomes a target gradation value.

Figure 13:
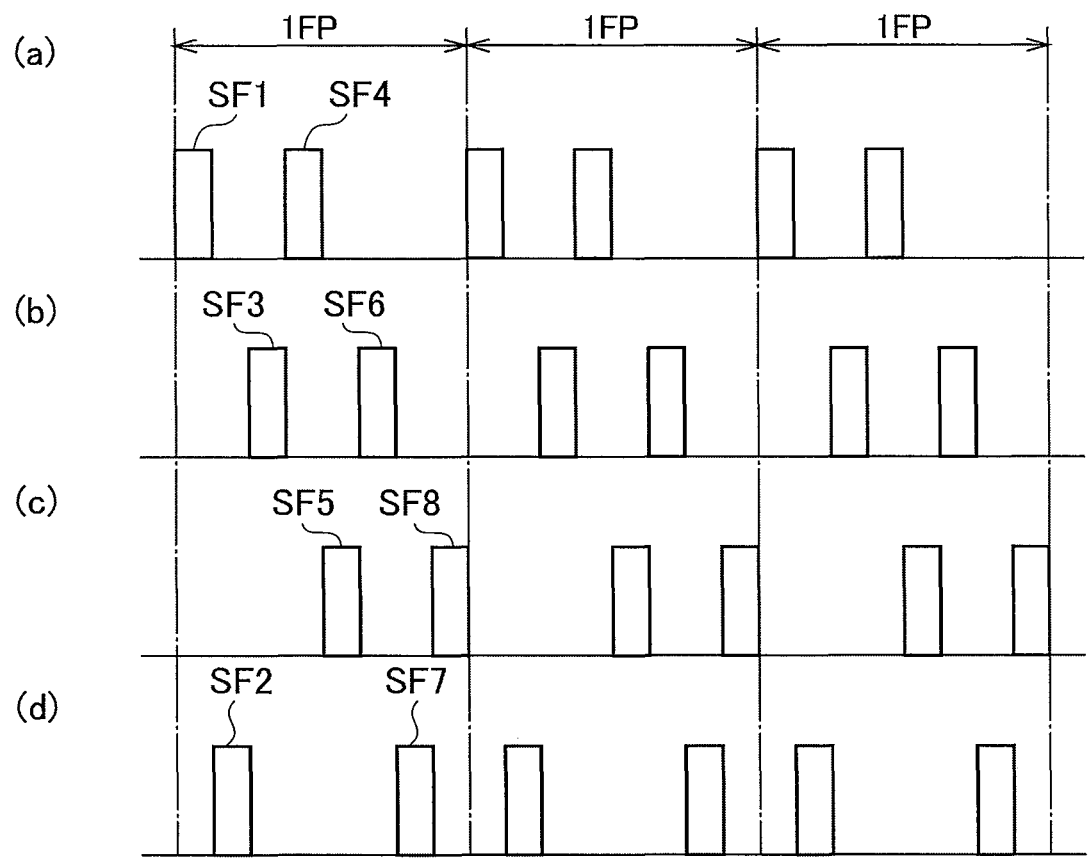
FIG. 13 is a diagram illustrating a case where sub-frame data converters corresponding to a plurality of pixels forming a pixel group convert video data into sub-frame data based on different sub-frame data conversion tables.

In the image display device 3 and the camera evaluation system 1, the sub-frame data conversion tables 231 to 234, 331 to 334, and 431 to 434 are set such that the display period or the sub-frames SF becomes continuously longer according to the gradation value. (a) to (d) of FIG. 13 respectively correspond to (a) to (d) of FIG. 9. As illustrated in (a) to (d) of FIG. 13, the sub-frame data conversion tables 231 to 234, 331 to 334, and 431 to 434 may be set such that the display period of the sub-frames SF becomes intermittently longer according to the gradation value.

Regarding the number of pixels 30 constituting a pixel group, in Examples 1 to 3, the case where four pixels in the projector 10 correspond to one pixel in the camera 4 has been described, but the number is not limited thereto. If the number of display pixels of the projector 10 corresponding to one pixel of the camera 4 is two or more, the number can be appropriately set based on the number of display pixels of the projector 10 corresponding to one pixel of the camera 4.

For example, even when the total number of pixels of the projector 10 is less than the total number of pixels of the camera 4, the display area of the projector 10 is a part of the photographing area of the camera 4, and the case where the number of display pixels of the projector corresponding to one pixel of the camera 4 is two or more can be applied.

In one or more embodiments described above, the case where the projector 10 is used as the image display device has been described, but the present invention can be applied to image display devices other than the projector as long as the image display device can switch and display the display image PV for each frame.

What is claimed is:

1. An image display device comprising:
   a video data processor configured to convert input video data into sub-frame data in which one frame is composed of a plurality of sub-frames; and
   a liquid crystal display device that comprises a display pixel unit in which a greater number of pixels than the number of pixels of a camera to be evaluated are arranged, and is configured to switch a display image to be captured by the camera for each frame asynchronously with the camera based on the sub-frame data to display the display image in a frame-sequential manner, wherein
   the video data processor comprises:
   a sub-frame data conversion table which differs for each of a plurality of pixels corresponding to one pixel of the camera; and
   a sub-frame data converter configured to convert the video data into the sub-frame data for each of the plurality of pixels based on the sub-frame data conversion table.

2. The image display device according to claim 1, wherein the sub-frame data conversion table is set such that a timing of a display period of the sub-frames is different for each of the plurality of pixels.

3. The image display device according to claim 1, wherein the video data processor comprises a sub-frame data conversion table which differs for each of a plurality of pixels arranged in a vertical direction or a horizontal direction in the display pixel unit, or for each of a plurality of pixels arranged in the vertical direction and the horizontal direction.

4. The image display device according to claim 1, wherein the sub-frame data conversion table is set such that a display period of the sub-frames becomes intermittently longer according to a gradation value.

5. A camera evaluation system comprising:
   an image display device configured to display a display image to be captured by a camera to be evaluated asynchronously with the camera based on input video data; and
   a data analysis device configured to analyze detection result data generated based on a captured image obtained by the camera capturing the display image, wherein
   the image display device comprises:
   a video data processor configured to convert the video data into sub-frame data in which one frame is composed of a plurality of sub-frames; and
   a liquid crystal display device that comprises a display pixel unit in which a greater number of pixels greater than the number of pixels of the camera are arranged, and is configured to switch the display image for each frame based on the sub-frame data to display the display image in a frame-sequential manner, wherein
   the video data processor comprises:
   a sub-frame data conversion table which differs for each of a plurality of pixels corresponding to one pixel of the camera; and
   a sub-frame data converter configured to convert the video data into the sub-frame data for each of the plurality of pixels based on the sub-frame data conversion table.

6. The camera evaluation system according to claim 5, wherein the sub-frame data conversion table is set such that a timing of a display period of the sub-frames is different for each of the plurality of pixels.

7. The camera evaluation system according to claim 5, wherein the video data processor comprises a sub-frame data conversion table which differs for each of a plurality of pixels arranged in a vertical direction or a horizontal direction in the display pixel unit, or for each of a plurality of pixels arranged in the vertical direction and the horizontal direction.

8. The camera evaluation system according to claim 5, wherein the sub-frame data conversion table is set such that a display period of the sub-frames becomes intermittently longer according to a gradation value.

* * * * *